Dec. 5, 1967    J. W. L. KOHLER ET AL    3,355,882
LEAKAGE PREVENTION ARRANGEMENT FOR HOT-GAS
RECIPROCATING APPARATUS

Filed Jan. 14, 1966    5 Sheets-Sheet 1

INVENTORS
JACOB W.L. KÖHLER
HERMAN FOKKER
ROELF J. MEIJERS
ALPHONS PETERS
BY
Frank R.
AGENT

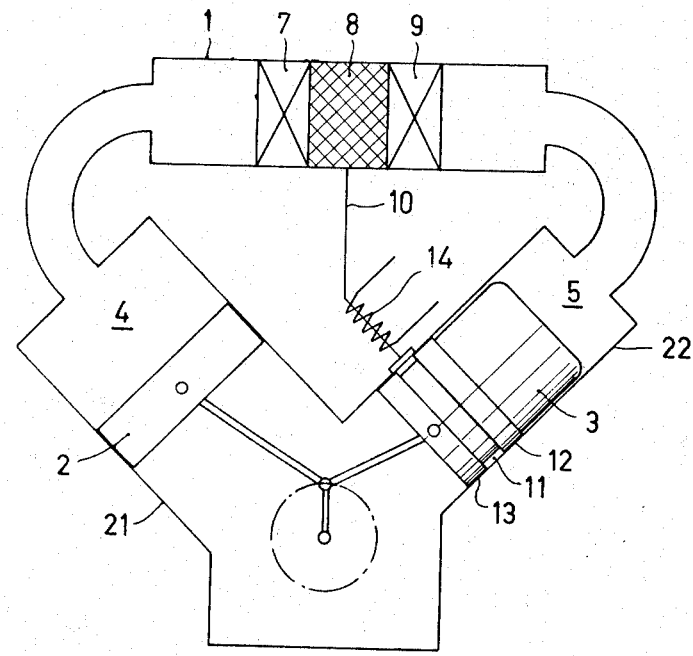
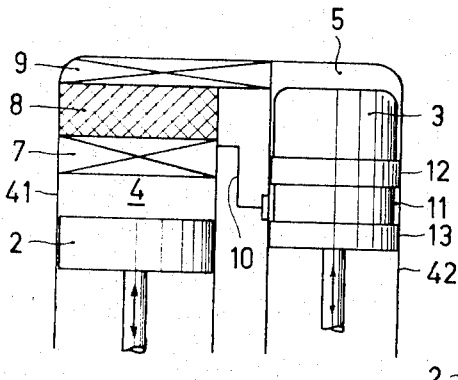
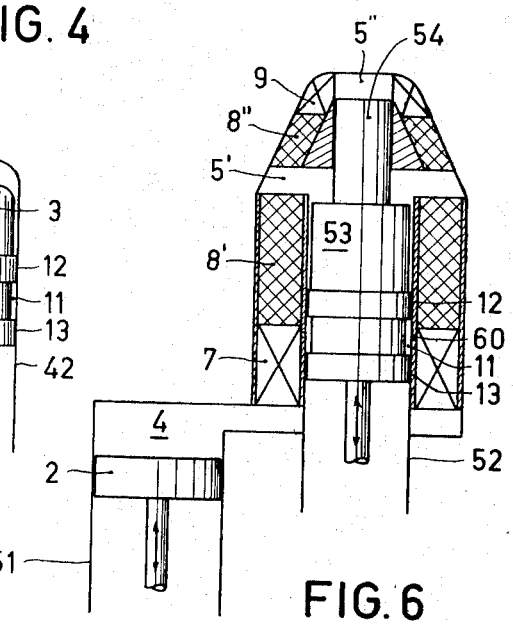
FIG. 4
FIG. 5
FIG. 6

United States Patent Office 3,355,882
Patented Dec. 5, 1967

3,355,882
LEAKAGE PREVENTION ARRANGEMENT FOR HOT-GAS RECIPROCATING APPARATUS
Jacob Willem Laurens Kohler, Herman Fokker and Roelf Jan Meijer, Emmasingel, Eindhoven, Netherlands, assignors to North American Philips Company, Inc., New York, N.Y., a corporation of Delaware
Filed Jan. 14, 1966, Ser. No. 536,207
Claims priority, application Netherlands, Jan. 20, 1965, 65—680
15 Claims. (Cl. 60—24)

The invention relates to a hot-gas reciprocating machine and more particularly to the cold-gas refrigerator type thereof, comprising at least one compression space with variable volume and at least one expansion space likewise with variable volume. Different average temperatures prevail in the said spaces during operation and said spaces communicate with one another, one or more regenerators being included in each of the said communications through which a working medium can flow back and forth. The engine further comprising piston-shaped members which reciprocate with a mutual phase difference for varying the volume of the expansion and compression space(s) respectively, each of the said members being provided with at least one seal.

A difficulty in known machines of the type to which the invention relates is the fact that a certain quantity of working medium leaks away along the piston-shaped bodies as a result of the differential pressure prevailing across the said bodies. The propensity for leakage of medium along a compression piston to the atmosphere in itself is no insurmountable problem. The medium disappears out of the working space with substantially ambient temperature so that no cold or thermal energy respectively is lost. The medium lost through leakage can be replenished at any desired instant by communicating the working space with a medium replenishing container. The leaking medium may also be recovered so that no loss of medium occurs.

The situation is far worse, however, when medium leaks away along one of the piston-shaped bodies from a warm to a cold space, or conversely. In this case always a quantity of thermal energy or cold will be lost which, naturally, adversely influences the operation of the machine. Since varying pressures and varying differential pressures always occur in the aforesaid machines, the said loss of cold and thermal energy respectively will occur even when on both sides of a piston-shaped body the same average pressure prevails.

In order to avoid the above occurrence, the hot-gas reciprocating machine according to the invention is constructed in a manner in which at least those piston-shaped members which can vary the volume of an expansion space with their one side and/or the part of the cylinder wall cooperating with each of the said members are provided with two seals. A space between the said seals communicates with a space in which such a pressure variation prevails that the differential pressure with respect to the presusre in the space on one side of the piston-shaped body concerned is smaller than the differential pressure with respect to the pressure prevailing in the space on the other side of the piston-shaped member, the communication being such that the medium between the two seals has a temperature which corresponds to the temperature prevailing in that space which has the greatest differential pressure with respect to the pressure in the said space.

In the foregoing manner it is achieved that substantially no differential pressure prevails across one of the seals so that no leakage will occur across that seal. A differential pressure with no temperature difference prevails across the other seal so that with the leakage medium, if any, no cold and thermal energy respectively is lost.

A further embodiment of the present invention is a hot-gas reciprocating machine in which seals are provided on one of the elements consisting of a piston-shaped member and the cylinder wall cooperating therewith, the communication with the said space being provided in the other element. In this embodiment according to the invention the ends of the two seals facing one another are spaced at a distance from one another which is at least equal to the stroke of the piston-shaped member concerned. As a result of this the said communication will always be maintained during operation. According to another embodiment of the present invention seals are provided in that part of the piston-shaped member in question across which no temperature gradient is present any longer in an axial direction. This means that the seals are operative substantially at the ambient temperature. So in a hot-gas engine the seals are not exposed to the high operating temperatures prevailing in the expansion space. For a cold-gas refrigerator this has the advantage inter alia that at the area of the seals the viscosity is larger and the density lower than the medium associated with the expansion temperature. As a result of this, leaking of the medium is hampered. This phenomenon is based on the fact that the viscosity of a gas is proportional to the temperature.

When the hot-gas reciprocating machine is constructed as a machine of the two-piston type with single-acting pistons which can vary the volume of a compression space and an expansion space respectively with their one side, according to an embodiment of the invention at least each of the pistons which can vary the volume of an expansion space/and or the parts of the cylinder wall cooperating with each of the said pistons is provided with two seals the space between the said seals communicating with a space in which substantially the same pressure variation occurs as in the expansion space, the communication further being such that the medium in the space between the seals has a temperature which corresponds substantially to the ambient temperature. In this manner the cold and warm medium respectively are prevented from leaking out of the expansion space to the atmosphere or to the sump.

In a further favorable embodiment of the invention, the space between the seals of each expension piston communicates through a duct with that compression space which communicates with the expension space the volume of which is varied by the piston concerned. In this manner it is achieved with very simple means that the pressure in the recess is always substantially equal to the pressure in the expansion space, the temperature of the medium in the recess being substantially equal to the compression temperature.

When according to a further embodiment of the invention a hot-gas reciprocating machine of the type to which the present invention relates comprises a cooler for cooling the medium in the compression space before it enters the regenerator, it comprises a duct which communicates with its one end with the space between the seals and with its other end opens out on the side of the cooler remote from the compression space. This has the great advantage that the working medium which alternately flows into and out of the duct is cooled before it enters the duct since otherwise the medium in the duct would become excessively warm. In fact, the medium in the duct is alternately compressed and expanded. As a result of the hysteresis of the heat transfer the medium becomes warmer and warmer. By cooling the medium before it enters the duct, heating of the medium is counteracted.

In a further embodiment of the present invention the hot-gas reciprocating machine according to the invention the said machine comprises a further cooler which cools the medium in the part of the duct that is connected in the space between the seals and/or the medium present in the said space.

According to a further embodiment of the hot-gas reciprocating machine according to the invention the duct includes a movable element which closes the duct, further means being provided to prevent the element from showing a deviation with respect to its central position. The movable element which may be a piston or a diaphragm prevents part of the working medium from flowing through the duct to the space between the seals and thence flowing back through the narrow gap between the expansion piston and the cylinder and through the regenerator to the compression space. This would mean an unbalance of the regenerator which would interfere with the satisfactory operation of the machine.

Another embodiment of a hot-gas reciprocating machine constructed in accordance with the teachings of the invention is characterized in that in each expansion piston the space between the seals communicates with the expansion space through a duct including a regenerator mass. In this manner the pressure in the space between the seals is equal to the pressure in the expansion space, while the regenerator ensures that the temperature in that space substantially corresponds to the ambient temperature.

A further embodiment of the present hot-gas reciprocating machine comprises several double-acting pistons which are each movable in a cylinder and which can vary with their one side the volume of an expansion space and with their other side can vary the volume of a compression space, in which an expansion space in one cylinder communicates through one or more regenerators with a compression space in another cylinder is characterized in that each piston and/or the cylinder wall cooperating therewith is provided with two seals in which the space between the said two seals communicates with a space of the machine in which substantially the same pressure variation prevails as in one of the spaces on either side of the piston concerned. The communication is such that the medium in the space between the seals has a temperature which substantially corresponds to the temperature which prevails in the other of the two spaces on either side of the said piston.

In a further embodiment of the present invention, the space between the seals communicates with a compression space which is located in another cylinder than the cylinder in which the piston in question is movable, the said compression space communicating with the expansion space the volume of which can be varied by the piston in question. If required, a cooler may be included in the communication duct.

In a still further embodiment of the present invention the space between the communications in each piston is movable in a cylinder communicating with an expansion space located in another cylinder, the said expansion space communicating with the compression space the volume of which can be varied by the piston in question.

In addition, it is possible according to the invention to communicate the space between the seals of each piston through a regenerator with one of the spaces on either side of the piston.

Medium leakage is prevented in all the above embodiments of hot-gas reciprocating machines with double-acting pistons whereby medium leaks out of one of the expansion spaces to one of the compression spaces, or vice versa.

The above described embodiments relate to hot-gas reciprocating engins of the two-piston type and two hot-gas reciprocating machines with double-acting pistons. In all these machines varying differential pressure always prevails across the pistons because the space on one side of the pistons belongs to the working space and the space on the other side is constituted by the atmosphere or the sump respectively, because the spaces on either side of the pistons belong to different working spaces.

In machines of the displacer type in which a compression piston can vary the volume of a compression space and a displacer influences with its one side also, the volume of the compression space and with its other side can vary the volume of one or more expansion spaces a certain differential pressure occurs as a result of the resistance to flow, inter alia of the regenerator, between the compression space and the expansion spaces communicating therewith. As a result of the said differential pressure part of the medium will leak along the displacer from the expansion space to the compression space, or vice versa, cold and thermal energy respectively being transported.

In order to avoid this, the displacer and/or the cooperating cylinder wall according to the invention is provided with two seals, the space between the two seals communicating with one of the spaces on either side of the displacer, at least one regenerator being included in that communication so that the medium in the recess has a temperature which is substantially equal to the temperature in the other of the two spaces located on either side of the displacer. In this manner again transport of cold and thermal energy respectively from the expansion space to the compression space is avoided.

A further embodiment of the present invention in which the displacer is constructed from several parts having different diameter, is constituted with each displacer part or the cylinder wall cooperating with the said part is provided with two seals, the spaces between the said seals each communicating through a regenerator with one of the spaces which are separated from one another by the two seals.

In order that the invention may readily be carried into effect a number of hot-gas reciprocating machines will now be described in greater detail, by way of example, with reference to the diagrammatic drawings, in which FIGURES 1, 2 and 3 diagrammatically show three separate embodiments of cold-gas refrigerators of the two-piston type and embodying the present invention.

FIGURE 4 is a cold-gas refrigerator of the two-piston type having cylinders in which the pistons reciprocate which are arranged in the form of a V.

FIGURE 5 shows a cold-gas refrigerator of the two-piston type in which the pistons can reciprocate in cylinders arranged parallel to one another.

FIGURE 6 diagrammatically shows a multi-stage cold-gas refrigerator.

Figure 7:
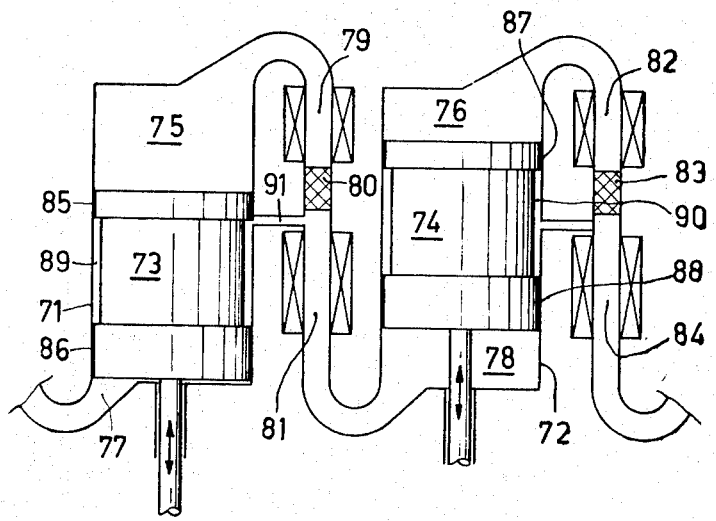
Figure 8:
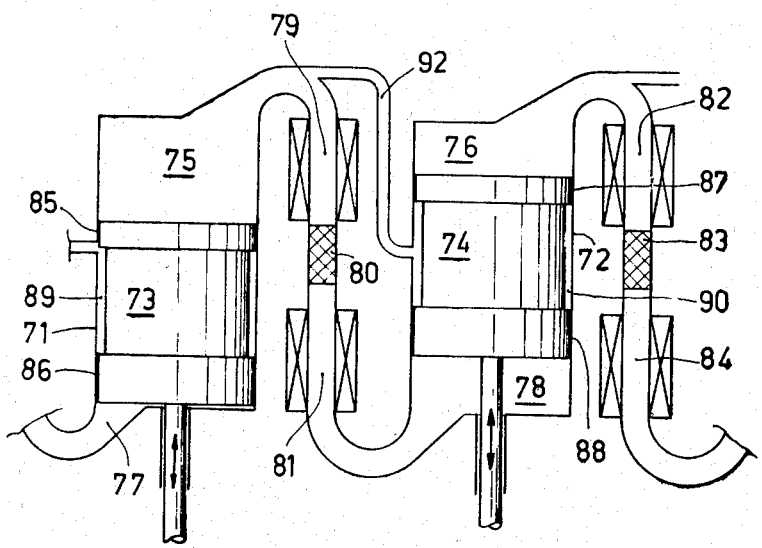
Figure 9:
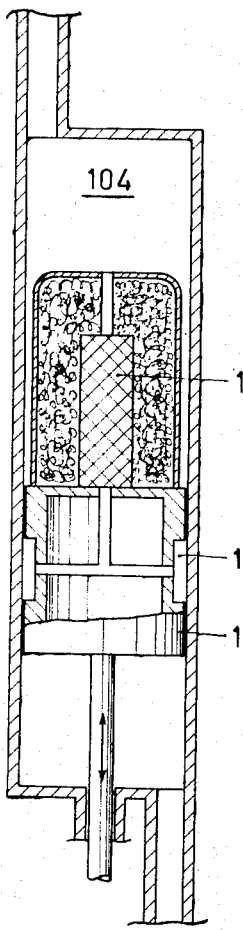

FIGURES 7, 8 and 9 diagrammatically show a few examples of multi-cylinder cold-gas refrigerators.

Figure 10:
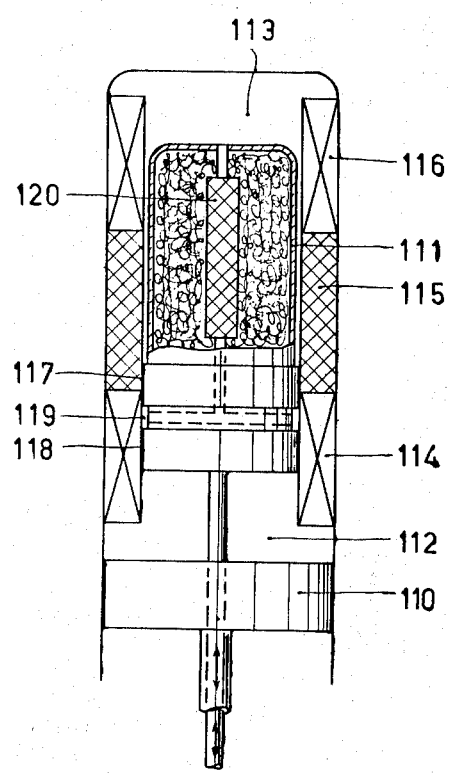

FIGURES 9 and 10 diagrammatically show two embodiments of cold-gas refrigerators of the displacer type.

Figure 1:
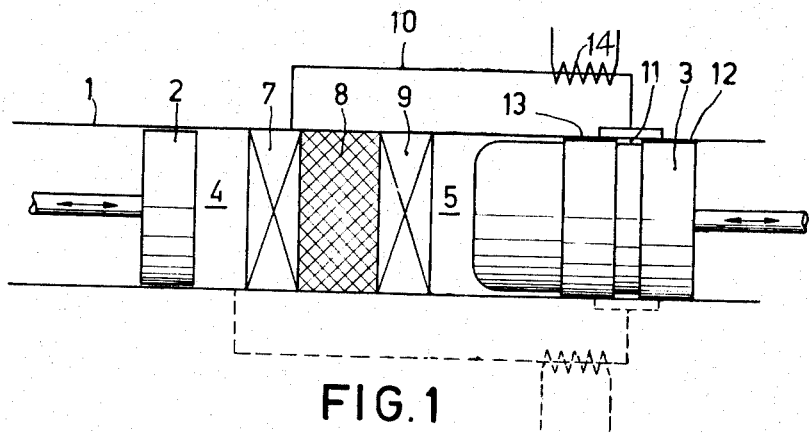

Referring to FIGURE 1, a cylinder is denoted by reference numeral 1. A compression piston 2 and an expansion piston 3 reciprocate out of phase in the cylinder. During the reciprocating movement, the compression piston 2 varies the volume of a warmer compression space 4, while the expansion piston 3 varies the volume of a very cold expansion space 5. The compression space 4 and the expansion space 5 communicate with one another through a cooler 7, a regenerator 8 and a freezer 9. In the cooler 7 the working medium supplies its compression heat to cooling water or to the air.

The seal between the cylinder 1 and the compression piston 2 may be constituted by a narrow gap seal, if required combined with one or more piston rings. As a result of this, some leakage will always occur. Since this leakage medium has substantially the ambient temperature, the influence on the operation of the engine is only small. Leakage of cooled medium along the expansion piston has a much greater influence on the correct operation of the engine. In order to avoid leakage of cold medium out of the space 5 along the expansion piston, said piston is provided with two piston seals 12 and 13 between which a space 11 is located. The ducts for the working medium in the cooler communicate through a duct 10 with the space 11 of the expansion piston 3.

So at any instant substantially the same pressure will prevail in the space 11 as in the expansion space 5. This means that no differential pressure prevails across the seal 13 so that no transfer of working medium can occur across the seal. A small amount of medium of ambient temperature will leak out of the space 11 across the seal 12 but this has comparatively little influence on the satisfactory operation of the machine. When on the side of the piston remote from the expansion space the average pressure prevails which occur in the working space, medium will leak away out of the space 11 during one half of a cycle and will leak to the space 11 during the other half of the cycle so that totally no leak occurs across the seal 12 also. In this case, when a temperature difference prevails across the seal 12, a heat transport could of course take place naturally. Although the medium which enters the duct 10 is already cooled in the cooler 7, a quantity of heat can be produced in the duct 10 by the alternate compression and expansion of the medium. In order to conduct away the said heat the duct 10 may include a cooler 14 in the proximity of the space 11.

Instead of opening into the cooler 7 the duct 10 may also open into the compression space 4 with its end remote from the space 11. This alternative embodiment is shown in broken lines in FIGURE 1.

Figure 2:
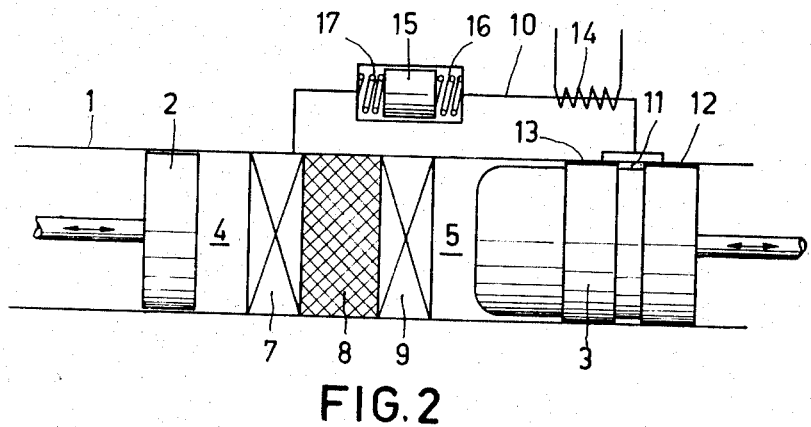

FIGURE 2 shows the same cold-gas refrigerator as FIGURE 1. However, in this embodiment a piston 15 is provided in the duct 10 which closes said duct. On either side of the piston slack springs 16 and 17 are provided which determine the central position of the piston. In this manner always the pressure is transferred from the compression space to the space 11 but the working medium cannot perform a cycle in the engine. This means that the medium cannot flow out of the compression space 4 through the duct 10 to the space 11 and thence flow back to the compression space through seal 13 through the regenerator. A possible unbalance of the regenerator is fully avoided by the said construction.

Figure 3:
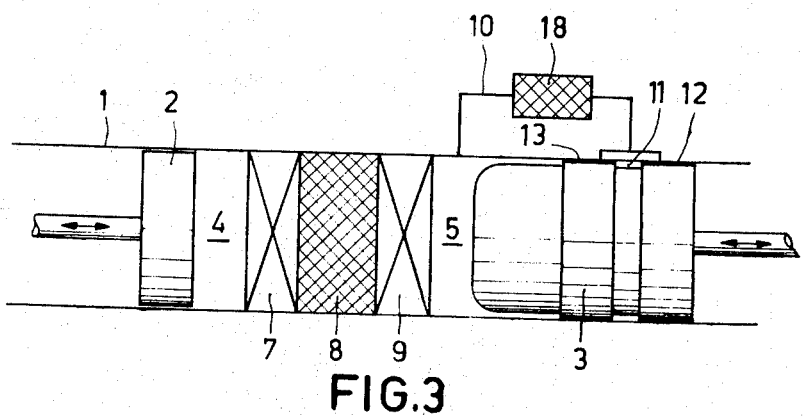

FIGURE 3 again shows the cold-gas refrigerator as shown in FIGURE 1. In this embodiment the duct 10 forms a communication between the expansion space 5 and the space 11. In order to keep the medium in the space 11 at substantially ambient temperature a regenerator 18 is included in the duct 10 which forms a temperature barrier between the cold expansion space and the warmer space 11.

In order to ensure the correct operation of the engine it is desirable that on the side of the piston remote from the expansion space the same average pressure will prevail as in the expansion space. If this is not the case the medium will always leak away in the same direction across the seal. Thus, to obtain a satisfactory operation of the engine medium must be supplemented at a point in the duct 10 between the regenerator 18 and the space 11.

FIGURE 4 shows a cold-gas refrigerator in which the compression piston 2 and the expansion piston 3 reciprocate in two cylinders 21 and 22 arranged in V-shape. The further construction is entirely equal to that of the cold-gas refrigerators shown in the preceding figures. In this machine also a groove-shaped space 11 in the expansion piston 3 again communicates through a duct 10 with the working medium ducts in the cooler 7. In this case also a piston or a regenerator may be provided, of course, in the duct 10.

FIGURE 5 diagrammatically shows another embodiment of a cold-gas refrigerator. In this embodiment the compression piston 2 and the expansion piston 3 reciprocate in two cylinders 41 and 42 arranged parallel to one another. The further structural elements are the same as those in the preceding figures and have therefore been given the same reference numerals. An advantage of said structure is that the distance between the cooler 7 and the space 11 is particularly small so that the volume of the duct 10 also may be minimum so that only very little dead space is present in the construction.

FIGURE 6 diagrammatically shows a multi-stage cold-gas refrigerator. This machine comprises a compression piston 2 reciprocating in a cylinder 51 and an expansion piston which is constructed from two parts 53 and 54 having different diameters. The expansion piston reciprocates in a cylinder 52. The compression space 4 communicates through a cooler 7 and a first regenerator 8' with a first expansion space 5' which in turn communicates through a second regenerator 8'' and a freezer 9 with a second expansion space 5''. The ducts of the working medium in the cooler communicate through an aperture 60 with the space 11. In this construction the communication duct between the cooler 7 and the space 11 is extremely short so that the said communication causes little dead volume and hardly any heat will be produced in the communication so that the cooler may be omitted.

In view of the above, the invention provides an extremely simple and efficient operating structure for a two-piston cold-gas refrigerator.

Although hereinabove only two-piston cold-gas refrigerators have been described, the invention may be used as well for two-piston hot-gas engines. The only difference is that the expansion space is at a higher temperature so that the seals and the space between them in this case do not serve for restricting the leakage of cold, but to prevent the leakage of thermal energy.

FIGURE 7 shows a multi-cylinder cold-gas refrigerator with double-acting pistons. This refrigerator comprises the cylinders 71 and 72 in which pistons 73 and 74 reciprocate. When pistons 73 and 74 reciprocate they can vary the volume of the expansion spaces 75 and 76 respectively and the volume of the compression spaces 77 and 78 respectively. The expansion space 75 communicates with the compression space 78 through a freezer 79, a regenerator 80 and a cooler 81. The expansion space 76 also communicates with a compression space through a freezer 82, a regenerator 83 and a cooler 84. In the case of a two-cylinder machine the cooler 84 communicates with the compression space 77. The piston 73 is provided with two piston seals 85 and 86 and the piston 74 is provided with the piston seals 87 and 88. A groove-shaped space 89 and 90 respectively is located between the said seals. The groove-shaped space 89 communicates with the compression space 78 through a duct 91. This means that always the same pressure prevails in the space 89 as in the expansion space 75. So no differential pressure prevails across the seal 85 although a temperature difference prevails across the said seal. Consequently, no cold medium can leak away to the warmer compression space 77 out of the expansion space 75. A differential pressure, but no temperature difference, prevails across the seal 86. When some medium passes the said seal this will not disturb the correct operation of the machine because no cold is lost. What was said of the piston 73 also holds good for the piston 74, the groove 90 of which also communicates with a compression space.

FIGURE 8 shows a multi-cylinder cold-gas refrigerator which in profile corresponds to the refrigerator shown in FIGURE 7. The difference is that the groove-shaped spaces 89 and 90 in this embodiment do not communicate with compression spaces but with expansion spaces. The space 90 communicates with the expansion space 75 through a duct 92. Therefore, approximately the same pressure and temperature will prevail in the space 90 as in the expansion space 75. This means that no differential pressure prevails across the seal 88 so that no cold medium can leak away to the compression space 78, or conversely. In addition, a differential pressure but no temperature difference prevails across the seal 87 so that in the case of leakage no cold is lost.

FIGURE 9 shows one cylinder of a multi-cylinder cold-gas refrigerator in which the groove-shaped space 100 communicates with the expansion space 104 through a regenerator 101. In this manner it is achieved again that the pressure in the space 100 is equal to the pressure in the space 104 while the regenerator ensures that the medium alternately leaking from one space to the other space through the seal 101 leaves and enters the said spaces always with substantially the same temperature.

It should be noted that the cold-gas refrigerators shown in FIGS. 7–9 can also be used as hot-gas engines.

FIGURE 10 diagrammatically shows a cold-gas refrigerator of the displacer type. This refrigerator comprises a compression piston 110 and a displacer 111. The compression piston and the lower side of the displacer can influence the volume of a compression space 112 while the displacer with its upper side can vary the volume of an expansion space 113. The compression and expansion spaces communicate with one another through a cooler 114, a regenerator 115 and a freezer 116. Although the compression and expansion spaces are in open communication with one another a certain differential pressure can occur, nevertheless, between the said spaces. This is caused by the resistance which the working medium experiences when flowing to and fro through the cooler, regenerator and freezer. As a result of this differential pressure the possibility exists that medium leaks through the gap between the displacer and the cylinder wall from the expansion space to the compression space, or conversely. In order to prevent that thermal energy and cold respectively is transported with this leaking medium, the displacer is provided with two seals 117 and 118 respectively. The space 119 between the said seals communicates with the expansion space 113 through a regenerator 120 with a low resistance to flow. The result of this is that in the space 119 the same temperature prevails as in the compression space, whereas the pressure in the space 119 is substantially equal to the pressure in the expansion space, so that at least a smaller differential pressure prevails across the seal 117 than across the seal 118.

Figure 11:
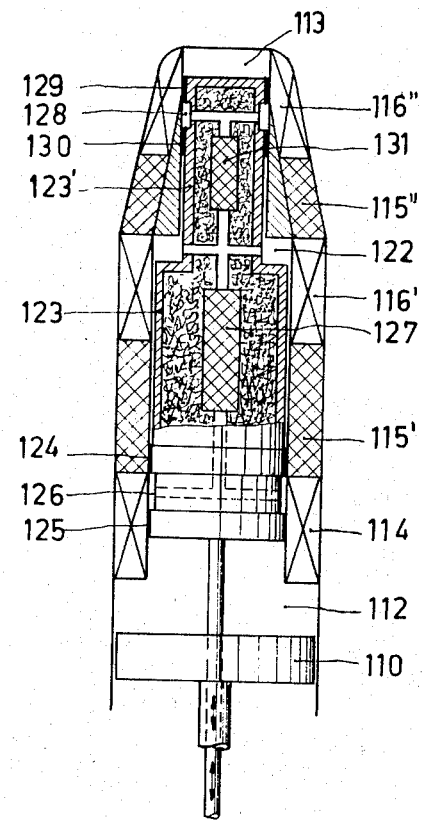

FIGURE 11 shows a cold-gas refrigerator of the displacer type which comprises two expansion spaces. The compression space 112 communicates with an intermediate expansion space 122 through a cooler 114, a first regenerator 115' and a first freezer 116'. The intermediate expansion space 122 communicates with the expansion space 113 through a second regenerator 115" and a second freezer 116". The displacer consists of two parts 123 and 123' of different diameters. The part 123 is provided with two piston seals 124 and 125, the space 126 between the said seals communicating with the intermediate expansion space 122 through a regenerator 127, the latter having a low resistance to flow. In the same manner the space 128 between the seals 129 and 130 on the second displacer part 123' communicates with the intermediate expansion space 122 through a regenerator 131. Consequently, it is achieved that substantially the same pressures prevail in the spaces 128 and 126 as in the intermediate expansion space 122.

In addition the regenerator 131 and 127 ensure that the same temperature pervails in the space 128 as in the expansion space 113 and the same temperature prevails in the space 126 as in the compression space 112. As result of the said measures transport of cold or thermal energy through the gaps between the displacer and the cylinder wall has been prevented.

What we claim is:

1. A hot-gas reciprocating apparatus comprising at least one cylinder, at least one compression space of variable volume and at least one expansion space of variable volume, different average temperatures prevailing in said spaces during operation, means communicating said spaces, at least one regenerator in said communicating means, a working medium flowing from the compression space to the expansion space and vice versa, a pair of piston-shaped members in at least one cylinder reciprocating with a mutual phase difference for varying the volume of said compression and expansion spaces respectively, at least one of said piston-shaped members varying the volume of said expansion space with one of its sides and the adjacent part of said cylinder co-acting therewith, said one of said piston-shaped members being provided with two spaced seals, a space between said two seals, means communicating said space between said two seals with a second space in which a pressure variation occurs whereby the differential pressure with respect to the pressure in the space on one side of said piston-shaped member is smaller than the differential pressure with respect to the pressure prevailing in the space on the other side of said piston-shaped member, the communication being such that the medium between the two seals has a temperature which is at least substantially equal to the temperature in that space in which the pressure prevails which has the greatest difference relative to the pressure in said space.

2. A hot-gas reciprocating apparatus as claimed in claim 1 wherein the two seals are located between said piston-shaped member and the adjacent cylinder wall and the ends of said seals facing each other are spaced apart a distance at least equal to the stroke of said piston-shaped member.

3. A hot-gas reciprocating apparatus as claimed in claim 1 wherein said two seals are provided on a part of said piston-shaped member where substantially no temperature gradient is present in the axial direction.

4. A hot-gas reciprocating apparatus as claimed in claim 1 wherein said piston-shaped members are of the single acting type, the one side of one of said piston-shaped members bounding the volume of the expansion space and the one side of the other of said piston-shaped members bounding the volume of the compression space, each of the piston-shaped members that can vary the volume of said expansion space being provided with said two spaced seals, the space between said seals communicating with another space in which substantially the same pressure variation occurs as in said expansion space, and means in said communication for causing the medium in the space between the seals to have a temperature which corresponds substantially to the ambient temperature.

5. A hot-gas reciprocating apparatus as claimed in claim 4 wherein the space between the seals of each expansion piston communicates through a duct with the compression space, the latter communicating the said expansion space, the volume of which can be varied by the related piston.

6. A hot-gas reciprocating apparatus as claimed in claim 4 further comprising a cooler adjoining the compression space being arranged in communication between each compression space and expansion space, and a duct connected at one end to the space between the seals and opening at the other end into the side of the cooler remote from the relative compression space in said communication between said compression space and expansion space.

7. A hot-gas reciprocating apparatus as claimed in claim 6 further comprising an additional cooler which cools the medium in at least a part of the duct communicating with said space between the seals.

8. A hot-gas reciprocating apparatus as claimed in claim 5 wherein the duct is provided with a movable element which closes said duct, and means being provided to prevent the displacement of said movable element out of its central position.

9. A hot-gas reciprocating apparatus as claimed in claim 4 further comprising a regenerator mass in said duct connected to said space between the seals, said space communicating through said duct to the expansion space, the volume of which can be varied by the related piston.

10. A hot-gas reciprocating apparatus comprising at least one cylinder, at least one compression space of variable volume, at least one expansion space of variable volume, different average temperatures prevailing in said spaces during operation, means communicating said spaces, at least one regenerator in said communicating means, a working medium flowing from the compression space to the expansion space and vice versa, a pair of double-acting pistons reciprocating in said cylinder and which can vary with one side thereof the volume of the compression spaces, said expansion space in said one cylinder communicating through said regenerator with the compressed space in another cylinder, each piston being provided with said two seals, the space between said two seals communicating with the space of the apparatus in which substantially the same pressure variation occurs as in one of the spaces on either side of the related piston, the communication being such that the medium in the space between the seals has a temperature which substantially corresponds to the temperature which prevails in the other of the two spaces located on either side of said piston.

11. A hot-gas reciprocating apparatus as claimed in claim 10 further comprising a cooler which communicates with the compression space of another cylinder, the compression space of said other cylinder communicating with the expansion space in said cylinder, the volume of said spaces being varied by the related piston.

12. A hot-gas reciprocating apparatus as claimed in claim 10 wherein said space between the seals in each double-acting piston movable in said cylinder communicates with the expansion space of another cylinder, said expansion space communicating with the compression space of said cylinder, the volume of said spaces being varied by the related piston.

13. A hot-gas reciprocating apparatus as claimed in claim 10 wherein in each piston said space between the seals communicates through at least one regenerator with one of the spaces on either side of said piston.

14. A hot-gas reciprocating apparatus as claimed in claim 1 wherein said apparatus is constructed as an engine of the displacer type in which said piston-like bodies are a compression piston and a displacer piston respectively, said compression piston varying the volume of said compression space and one side of said displacer piston also varies the volume of said compression space, the other side of said displacer piston varying the volume of said expansion space, said displacer piston being provided with said two spaced seals, the space between said seals connecting with one of the spaces on either side of said displacer piston, at least one regenerator located in said connection so that the medium in said space has a temperature which is substantially equal to the temperature in the other of said two spaces on either side of the displacer piston.

15. A hot-gas reciprocating apparatus as claimed in claim 14 wherein said displacer piston has different parts of different diameters, said displacer piston being provided with said spaced seals, the space between the seals communicating through said regenerator with one of the compression or expansion spaces.

No references cited.

MARTIN P. SCHWADRON, *Primary Examiner.*

ROBERT R. BUNEVICH, *Examiner.*

UNITED STATES PATENT OFFICE
CERTIFICATE OF CORRECTION

Patent No. 3,355,882                                December 5, 1967

Jacob Willem Laurens Kohler et al.

It is hereby certified that error appears in the above numbered patent requiring correction and that the said Letters Patent should read as corrected below.

Column 1, line 60, for "presusre" read -- pressure --; column 3, line 72, for "engins" read -- engines --; column 5, line 58, for "seal" read -- seal 12 --; column 8, line 50, for "communicating the" read -- communicating with --.

Signed and sealed this 7th day of January 1969.

(SEAL)
Attest:

Edward M. Fletcher, Jr.                                    EDWARD J. BRENNER

Attesting Officer                                                 Commissioner of Patents